(12) United States Patent
Viswanathan et al.

(10) Patent No.: US 8,781,160 B2
(45) Date of Patent: Jul. 15, 2014

(54) IMAGE OBJECT TRACKING AND SEGMENTATION USING ACTIVE CONTOURS

(75) Inventors: Srikrishnan Viswanathan, Mumbai (IN); Subhasis Chaudhuri, Mumbai (IN)

(73) Assignee: Indian Institute of Technology Bombay, Powai, Mumbai (IN)

( * ) Notice: Subject to any disclaimer, the term of this patent is extended or adjusted under 35 U.S.C. 154(b) by 578 days.

(21) Appl. No.: 12/650,894

(22) Filed: Dec. 31, 2009

(65) Prior Publication Data
US 2011/0158474 A1 Jun. 30, 2011

(51) Int. Cl.
*G06K 9/00* (2006.01)

(52) U.S. Cl.
USPC .......................................... 382/103; 382/199

(58) Field of Classification Search
None
See application file for complete search history.

(56) References Cited

U.S. PATENT DOCUMENTS

| | | | | |
|---|---|---|---|---|
| 5,210,799 | A * | 5/1993 | Rao | 382/103 |
| 5,862,245 | A * | 1/1999 | Renouard et al. | 382/113 |
| 6,546,117 | B1 * | 4/2003 | Sun et al. | 382/103 |
| 6,654,497 | B1 * | 11/2003 | Kondo et al. | 382/199 |
| 6,912,310 | B1 * | 6/2005 | Park et al. | 382/199 |
| 2003/0081837 | A1 * | 5/2003 | Williame et al. | 382/215 |
| 2004/0028260 | A1 * | 2/2004 | Higaki et al. | 382/118 |
| 2005/0207630 | A1 * | 9/2005 | Chan et al. | 382/131 |
| 2006/0262960 | A1 * | 11/2006 | Le Clerc et al. | 382/103 |
| 2007/0206836 | A1 * | 9/2007 | Yoon et al. | 382/104 |
| 2008/0193006 | A1 * | 8/2008 | Udupa et al. | 382/131 |
| 2008/0240526 | A1 * | 10/2008 | Suri et al. | 382/128 |

OTHER PUBLICATIONS

Aubert, G. et al., "Image Segmentation using Active Contours: Calculus of Variation or Shape Gradients?," SIAM J. Applied Mathematics, vol. 63, No. 6, 2003, pp. 2128-2154.
Caselles, V. et al., "Geodesic Active Contours," IJCV, vol. 22, No. 1, 1997, pp. 61-79.
"CAVIAR Test Case Scenarios," accessed at: : http://homepages.inf.ed.ac.uk/rbf/CAVIARDATA1/Video clips created Jul. 11, 2003 and Jan. 20, 2004, pp. 9.
Chan, T. F. and Vese, L. A., "Active Contours Without Edges," IEEE Trans. on Image Proc., vol. 10, No. 2, 2001, pp. 266-277.
Chan, T.F. et al., "Euler's Elastica and Curvature Based Inpainting," SIAM J. of Appl. Math., vol. 62, No. 2, pp. 1-28.
Charpiat, G. et al., "Generalized Gradients: Priors on Minimization Flows," IJCV, vol. 73, No. 3, 2001, pp. 325-344.
Cohen, L. and Cohen, I., "Finite-Element Methods for Active Contour Models and Balloons for 2-D and 3-D Images," IEEE PAMI, vol. 15, No. 11, 1993, pp. 1131-1147.
Collewet, C., "Polar Snakes: A Fast and Robust Parametric Active Contour Model," to appear in the IEEE International Conference on Image Processing, Nov. 2009, Cairo, Egypt, #3785, pp. 3013-3016.
Cong, G. and Parvin, B., "Curve Evolution for Corner Enhancement," In: ICPR, vol. 1, pp. 708, 1998.

(Continued)

*Primary Examiner* — Jingge Wu
(74) *Attorney, Agent, or Firm* — Brundidge & Stanger, P.C.

(57) ABSTRACT

A method of image object tracking and segmentation is provided. The method includes defining an initial contour for tracking an image object and partitioning the initial contour into a plurality of contour segments. The method also includes estimating a weighted length of each of the plurality of contour segments and generating a desired contour by converging the plurality of contour segments to a plurality of edges of the image object using the estimated weighted length.

19 Claims, 3 Drawing Sheets

(56) References Cited

OTHER PUBLICATIONS

Cremers, D. and Soatto, S., "Motion Competition: A Variational Approach to Piecewise Parametric Motion Segmentation," IJCV, vol. 62, No. 3, 2004, pp. 249-265.

Delingette, H. and Montagnat, J., "Shape and Topology Constraints on Parametric Active Contours," Comput. Vis. Image Underst., vol. 83, No. 2, 2001, pp. 140-171, ISSN 1077-3142.

Fantoni C. and Gerbino, W., "Contour Interpolation by Vector Field Interpolation," Jrnl of Vis., vol. 3, No. 10, 2003, pp. 281-303.

Fua, P. and Leclerc, Y. G., "Model Driven Edge Detection," Mach. Vision Appl. 3 (1) (1990) pp. 45-56, ISSN 0932-8092.

Grayson, M.A., "The Heat Equation Shrinks Embedded Plane Curves to Round Points," J. of Diff. Geom., vol. 26, 1987, pp. 285-314.

Kaniza, G., "Contours Without Gradients or Cognitive Contours," Ital. Journal Psych. 1 (1971) 93-112. Abstract only 1 page.

Kass, M. et al., "Snakes: Active Contour Models," IJCV (1988) pp. 321-331.

Kichenessamy, S. et al., Gradient Flows and Geometric Active Contour Models, In Proc. of IEEE ICCV, pp. 810-815, 1995.

Kimmel, R. and Bruckstein, A. M., "Regularized Laplacian Zero Crossings as Optimal Edge Integrators," IJCV 53 (3) (2003) 225-243, ISSN 0920-5691.

Li, C. C et al., "Segmentation of Edge Preserving Gradient Vector Flow: An Approach Toward Automatically Initializing and Splitting of Snakes," In: CVPR '05:—vol. 1, pp. 162-167, 2005.

Olivier, N. P. et al., "Gradient Vector Flow Fast Geodesic Active Contours," In IEEE International Conference in Computer Vision, pp. 67-73, 2001.

Olszewska, J.I. et al., "Non-Rigid Object Tracker Based on a Robust Combination of Parametric Active Contour and Point Distribution Model", Proceedings of SPIE on Visual communications and image processing, 2007, San Jose, Calif., vol. 6508, No. 2, pp. 65082A.1-65082A.B.

Paragios, N. and Deriche, R., "Geodesic Active Regions and Level Set Methods for Motion Estimation and Tracking," Comput. Vis. Image Underst., vol. 97, No. 3, 2005, pp. 259-282, ISSN 1077-3142.

Precioso, F. and Barloud, M. "B-Spline Active Contour with Handling of Topology Changes for Fast Video Segmentation", EURASIP Journal on Applied Signal Processing, vol. 2002 Issue 1, Jan. 2002, pp. 555-560.

Rochery, M. et al., "Higher Order Active Contours," IJCV, vol. 69, No. 1, 2006, pp. 27-42, ISSN 0920-5691.

Ronfard, R., "Region Based Strategies for Active Contour Models," IJCV, vol. 13, No. 2, 1994, pp. 229-251.

Sapiro, G., "Color Snakes," CVIU, vol. 68, No. 2, 1997, pp. 247-253, ISSN 1077-3142.

Sarti, A. et al., "Subjective Surfaces: A Geometric Model for Boundary Completion," IJCV, vol. 46, No. 3, 2002, pp. 201-221, ISSN 0920-5691.

Schoenemann, T. and Cremers, D. "Introducing Curvature into Globally Optimal Image Segmentation: Minimum Ratio Cycles on Product Graphs," Computer Vision, IEEE International Conference on, 2007, pp. 1-6.

Sharon, E. et al., "Completion Energies and Scale," IEEE Trans. PAMI., vol. 22, No. 10, 2000, pp. 1117-1131, ISSN 0162-8828.

Srikrishnan, V. et al., "On Stabilisation of Parametric Active Contours" IEEE Computer Society Conference on Computer Vision and Pattern Recognition, 2007, pp. 1-6.

Xie, X. and Mirmehdi, M., "MAC: Magnetostatic Active Contour Model," IEEE Transactions on Pattern Analysis and Machine Intelligence, vol. 30, No. 4, 2008, pp. 632-646, ISSN 0162-8828.

Xu, C. and Prince, J.L., "Snakes, Shapes, and Gradient Vector Flow," IEEE Trans. on Image Proc., vol. 7, No. 3, 1998, pp. 359-369.

Xu, C. et al., "On the Relationship between Parametric and Geometric Active Contours," In: Proc. 34th Asilomar Conference on Signals, Systems, and Computers, pp. 483-489, 2000.

Zhu, S. C. and Yuille, A. "Region Competition: Unifying Snakes, Region Growing, and Bayes/MDL for Multiband Image Segmentation," IEEE Trans. on PAMI, vol. 18, No. 9, 1996, pp. 884-900, ISSN 0162-8828.

Srikrishnan, V. and Chaudhuri, S., "Distraction-Free Evolution of Active Contours", 7th International Conference on Advances in Pattern Recognition, 2009, pp. 1-5.

Srikrishnan, V. and Chaudhuri, S., "Adaptive Smoothness Based Robust Active Contours", Vision and Image Processing Lab, Electrical Engineering Department, Preprint to: Image and Vision Computing, May 26, 2009, pp. 1-23.

\* cited by examiner

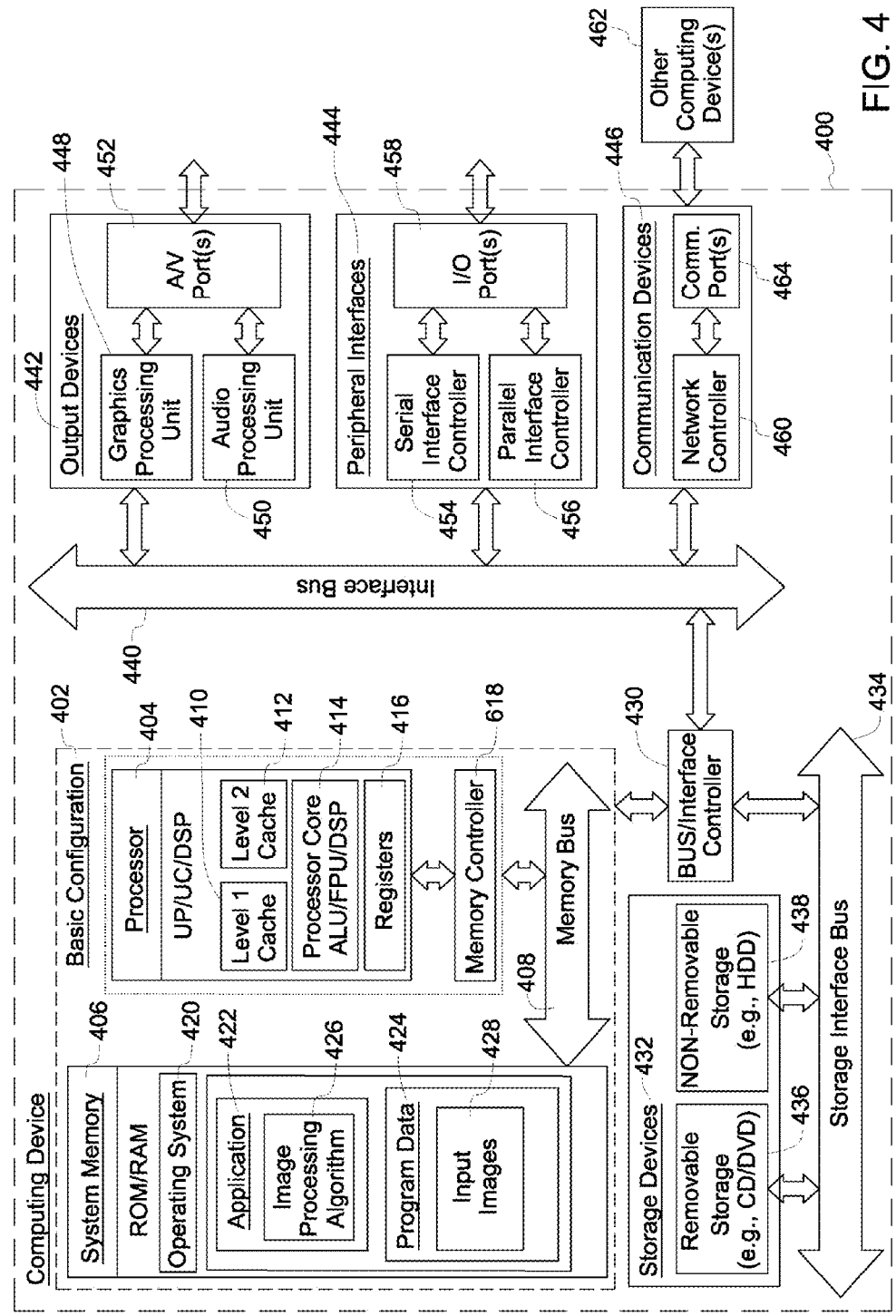

IMAGE OBJECT TRACKING AND SEGMENTATION USING ACTIVE CONTOURS

BACKGROUND

Image segmentation for identifying and tracking objects in images and videos is required for a variety of applications such as medical imaging, remote sensing, security surveillance and military target detection. One method of tracking image objects is through active contours whose evolution on an image plane leads to image segmentation and object tracking.

Typically, an energy functional is defined on the contour, based on either region or gradient properties of the model. Further, the total energy functional is estimated as a weighted combination of internal and external energy terms. In some cases, a combination of both properties is used. The minima of the total energy functional is obtained through solution of Euler Lagrange equations for the energy functional. Typically, for the energy functionals defined on the contour, these are generally partial differential equations and are solved numerically till convergence. Furthermore, for gradient based active contour models, clutter surrounding the image object may lead to multiple local minima thereby resulting in incorrect segmentation.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, a method of image object tracking and segmentation is provided. The method includes defining an initial contour for identifying an image object and partitioning the initial contour into a plurality of contour segments. The method also includes estimating a weighted length of each of the plurality of contour segments and generating a desired contour by converging the plurality of contour segments to a plurality of edges of the image object using the estimated weighted length.

In accordance with another aspect, a method of image object tracking and segmentation is provided. The method includes initializing a contour for tracking an image object, partitioning the contour into a plurality of contour segments and estimating a weighted length of each of the plurality of contour segments based upon a length of the respective contour segment and a gradient of an underlying edge of the image object. The method also includes computing an internal energy value for each of the plurality of contour segments based upon the estimated weighted length of each of the contour segments and a smoothness functional and generating a desired contour by guiding the plurality of contour segments towards edges of the image object using the computed internal energy value.

In accordance with another aspect, a system for tracking an image object is provided. The system includes a memory circuit configured to store an input image with at least one image object and an image processing circuit configured to initialize an initial contour for tracking the at least one image object and to obtain a desired contour by converging a plurality of contour segments to edges of the image object based upon an internal energy of the contour segments. The internal energy is estimated based upon a weighted length of each of the plurality of contour segments and a smoothness functional.

BRIEF DESCRIPTION OF THE FIGURES

FIG. 4 is a block diagram illustrating an example computing device that is arranged for image object tracking and segmentation.

DETAILED DESCRIPTION

Figure 1:
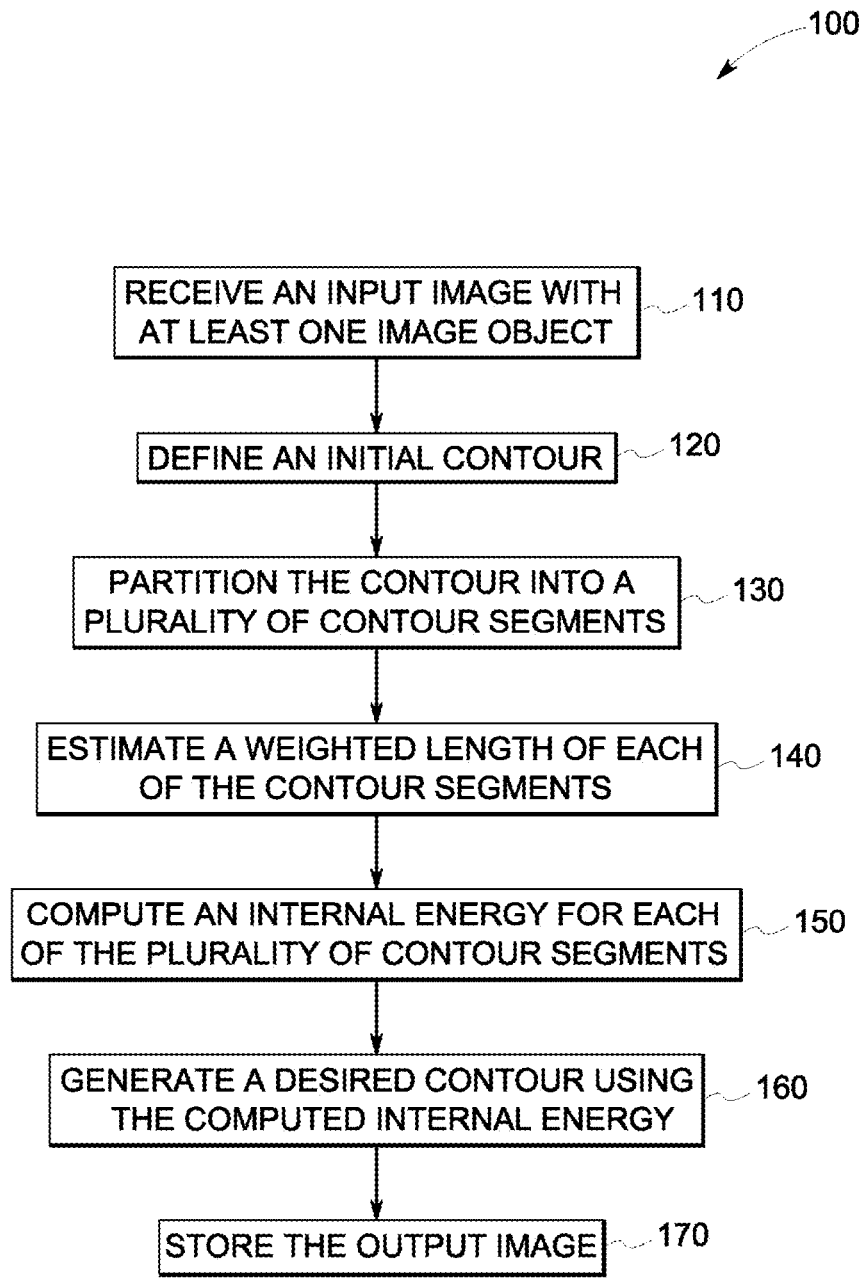
FIG. 1 is an example flow diagram of an embodiment of a method of image object tracking and segmentation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Example embodiments are generally directed to image object tracking and segmentation. Such techniques may be useful for tracking objects in images or videos such as required in medical imaging and security applications.

Referring now to FIG. 1, an example flow diagram 100 of an embodiment of a method of image object tracking and segmentation is illustrated. At block 110, an input image with at least one image object to be tracked is received. Further, an initial contour for tracking an image object is defined (block 120). In this embodiment, the initial contour includes an active contour. As used herein, the term "active contour" includes a curve whose evolution on an image plane enables segmentation and image object tracking. The initial contour may include a manually drawn outline for tracking the image object. In one embodiment, the initial contour includes a region based contour. In another embodiment, the initial contour includes an edge based contour.

In the illustrated embodiment, the contour is a closed planar curve and is represented by the following relationship:

$$C(p,t)=[x(p,t),y(p,t)] \qquad (1)$$

Where: p is the parameter employed to parameterize the initial contour C ($0 \leq p \leq 1$);
and
t is a time parameter of evolution of the contour C.

The initial contour $C(p,0)$ may be provided by user initialization or generated automatically by a pre-processing technique. In this embodiment, a curvature of the contour is denoted by $\kappa$ and inward normal and tangent vectors are represented by $N(p,t)$ and $T(p,t)$ respectively. In the illustrated embodiment, the image is denoted by I and an image value (gray-scale or color) at a point on the curve $C(p,t)$ is denoted by I(C). It should be noted that dependence on the time parameter t is eliminated for ease of understanding in the description below.

At block 130, the initial contour is partitioned into a plurality of contour segments. In this example embodiment, the points of the initial contour are grouped into the plurality of contour segments based upon pre-determined thresholds. In particular, a pre-determined threshold ($\theta$) may be selected and the points of the curve may be grouped based upon a comparison of the magnitude of the image gradient $|\nabla I|$ with the threshold ($\theta$).

Moreover, a weighted length of each of the plurality of contour segments is estimated (block 140). The weighted length is estimated based upon a length of the respective contour segment and the gradient of an underlying edge of the image object. In this example embodiment, the weighted length ($\omega_i$) of each of the plurality of contour segments C is estimated in accordance with the following relationship:

$$\omega_i = \frac{\int_{l(pi)}^{u(pi)} |\nabla I(C)||C_p| dp}{\int_0^1 |\nabla I(C)||C_p| dp} \quad (2)$$

Where: $l(p_i)$ and $u(p_i)$ are curve parameters corresponding to beginning and end of the respective contour segment; and
$l(p_i)=u(p_{i-1})$ between consecutive contour segments,
Where: $C_p$ is the derivative with respect to parameter p.

In this embodiment, the weighted length ($\omega_i$) represents a normalized weighted length of the $i^{th}$ contour segment, where the weight is the gradient magnitude of the underlying image. The value of the weighted length ($\omega_i$) is between 0 and 1. It should be noted that the weighted length is equal to 1 for a curve that lies on a single continuous edge of the image object and 0 when the contour lies on a substantially noisy region. Further, a higher value of the weighted length may be indicative of the contour segment lying along a true edge of the image object. In this embodiment, the contour segments with less weighted length are moved towards the contour segments with higher weighted lengths as described below.

At block 150, an internal energy value for each of the plurality of contour segments is computed. In this embodiment, the internal energy value is computed based upon the estimated weighted length ($\omega_i$) and a smoothness functional h(C) in accordance with the following relationship:

$$E_{int}(C) = \int_0^1 y(p) h(C) dp \quad (3)$$

Where: $\gamma(p)$ is a smoothness weight represented by the following relationship:

$$y(p) = (1 - \omega_i) \exp\left\{-\frac{L(p)}{\sigma_i^2}\right\} \quad (4)$$

Where: is distance of a point C(p) from midpoint of the $i^{th}$ contour segment; and
$\sigma_i$ is a parameter to control a gradient of the smoothness weight $\gamma(p)$.

In the illustrated embodiment, the value of $\sigma_i$ is obtained by a user defined value of $\gamma(p)$ at the intersection of any two adjacent contour segments. In this embodiment, the value of $\gamma(p)$ is substantially same at the intersection points of all the contour segments.

The distance L(p) is further estimated in accordance with the following relationship:

$$L(p) = \left| \frac{\int_{l(p)}^{u(p)} |C_p| dp}{2} - \int_{l(p)}^p |C_p| dp \right| \quad (5)$$

In this example embodiment, the smoothness functional h(C) includes a length minimizing function. However, a variety of other smoothness functional may be employed.

In this example embodiment, the smoothness functional is represented by the following relationship:

$$h(C) = \int_0^1 \kappa^2 dp \quad (6)$$

In another example embodiment, the smoothness functional is represented by the following relationship:

$$h(C) = \int_0^1 \kappa^2 dp \quad (7)$$

Where $\kappa$ is the curvature of the contour segment.

Therefore, the internal energy value is computed in accordance with the following relationship:

$$E_{int}(C) = \int_0^1 y(p) |C_p| dp \quad (8)$$

At block 160, a desired contour is generated by guiding the plurality of contour segments towards edges of the image object using the computed internal energy. In this example embodiment, the plurality of contour segments are guided towards a single continuous edge by adjusting to the edges of the image object using the computed internal energy. In this embodiment, an external energy value is estimated for each of the plurality of contour segments. Further, the external energy value is combined with the computed internal energy to define the complete energy functional. The complete energy functional is progressively minimized to generate the desired contour.

In one example embodiment, a gradient vector flow (GVF) field is utilized for estimating the external energy value. In this embodiment, the GVF field is defined as a vector field represented by v(x, y)=[u(x, y), v(x, y)] that minimizes an energy function represented by the following relationship:

$$\epsilon = \iint \mu(u_x^2 + u_y^2 + v_x^2 + v_y^2) + |\nabla f|^2 |v - \nabla f|^{2 dxdy} \quad (9)$$

Where: $\nabla f$ represents a gradient of an edge map of an image object I(x, y).

In this example embodiment, the corresponding contour evolution is represented by the following equation:

$$C_t(p) = y(p) \kappa(p) N(p) \quad (10)$$

In this embodiment, the energy functional is minimized such that contour segments having less weighted length are guided towards contour segments having higher weighted lengths. In certain embodiments, a first set of contour segments with weighted lengths above a threshold value are identified. Further, a second set of contour segments with weighted lengths below a threshold value are identified. The second set of contour segments is then guided towards the first set of contour segments with higher weighted lengths to generate the desired contour. At block 170, an output image with the desired contour is stored. In certain other embodiments, the output image with the desired contour is displayed to a user. In one example embodiment, the output image with the desired contour may be utilized as an input for segmentation of a subsequent image frame of a video.

Figure 2:
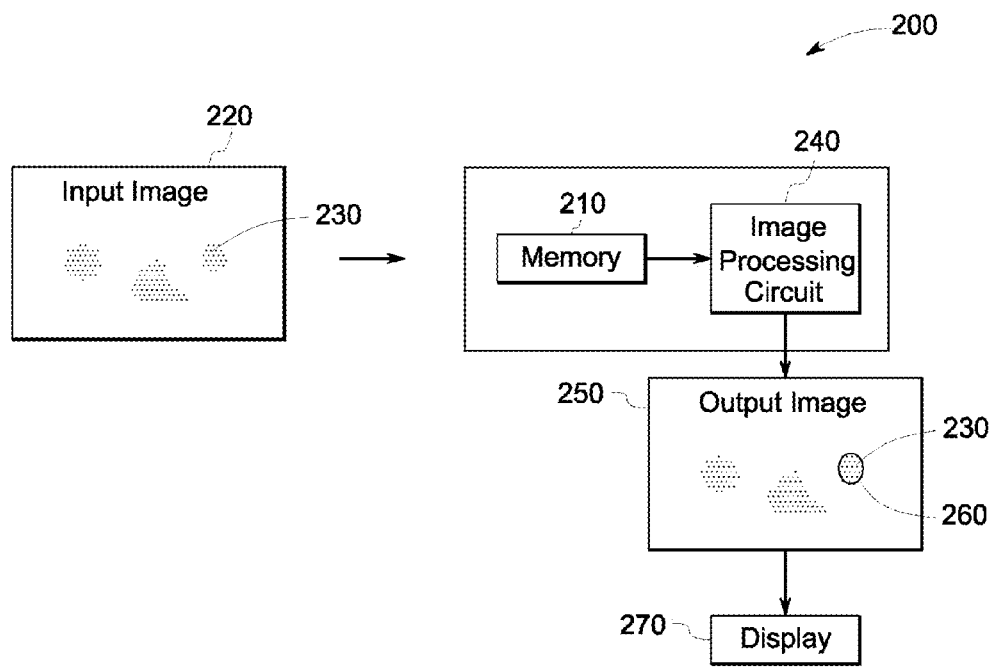
FIG. 2 is an example system for image object tracking and segmentation.

FIG. 2 illustrates an example image object tracking system 200. The image object tracking system 200 includes a memory 210 configured to store an input image 220 with at least one image object, such as represented by reference numeral 230. The input image 220 may be obtained using any suitable image capture device (not shown) and stored in the memory 210 for image object tracking and segmentation purposes.

The memory 210 may include hard disk drives, optical drives, tape drives, random access memory (RAM), read-only memory (ROM), programmable read-only memory (PROM), redundant arrays of independent disks (RAID), flash memory, magneto-optical memory, holographic memory, bubble memory, magnetic drum, memory stick, Mylar® tape, smartdisk, thin film memory, zip drive, and so forth.

It should be borne in mind that, although a single memory is described here, the storing function may be performed by more than one memory devices associated with the system for storing image processing routines, input images, and so forth.

Referring again to FIG. 2, the image generation system 200 also includes an image processing circuit 240 configured to define an initial contour to track the at least one image object 230 and to obtain a desired contour to track the at least one object 230. In one embodiment, the initial contour includes a geometric representation of the contour known as level sets. In another embodiment, the initial contour includes a parametric contour. Examples of parametric contours include B-splines and Fourier descriptors. In this example embodiment, the initial contour includes a cubic B-spline.

The image processing circuit 240 is configured to partition the initial contour into a plurality of contour segments and to converge the plurality of contour segments to edges of the image object 230 based upon an internal energy of the contour segments. In particular, the image processing circuit utilizes gradient vector force (GVF) segmentation with a space varying smoothness term based on the continuity prior to generate the desired contour. The space varying smoothness term applies a penalty to contour segments moving away from a long edge thereby raising the energy of the contour. As a result, such contour segments are guided towards the object of interest.

In the illustrated embodiment, a desired contour segmenting the image object 230 is represented by reference numeral 260 in an output image 250. In certain embodiments, the output image 250 with the segmented image object 230 is stored in a memory (not shown) for further processing. In other embodiments, the output image 250 may be displayed to a user through a display 270.

In operation, points of the initial contour are grouped into the plurality of contour segments based upon pre-determined thresholds. The number of contour segments is configurable and may be determined by a user of the system 200. In an alternate embodiment, the number of contour segments may be automatically determined by the system based upon the pre-determined thresholds.

In this example embodiment, the internal energy is computed based upon a weighted length of each of the plurality of contour segments and a smoothness index of the contour segments. In particular, the internal energy is a spatially adaptive quantity that is estimated using gradient data of points along the contour segments thereby facilitating converging of the contour segments to edges of the image object 230 rather than to any distracting edges in the vicinity of the image object 230.

In this example embodiment, relatively high weighted lengths are assigned to contour segments lying along edges of the image object 230. Further, deviation from contour segments with high weighted lengths is penalized using the smoothness functional, as described above with reference to FIG. 1.

In one example embodiment, the image processing circuit 240 is configured to assign a higher internal energy value to a shorter contour segment lying along a strong distracting edge as compared to a longer contour segment lying along a weaker edge of the image object. Thus, the resulting contour evolution is robust against spurious long edges in the vicinity of the initial contour.

The image processing circuit 240 is configured to estimate an external energy for the plurality of contour segments. The external energy is estimated based upon parameters of the underlying image. Example parameters include, but are not limited to, texture of the image, or a gradient of the image, or combinations thereof. Further, the image processing circuit 240 is configured to estimate an energy functional by combining the external energy and the estimated internal energy.

Moreover, the energy functional is minimized to achieve the desired contour. In one example embodiment, the desired contour is generated by obtaining solution of the Euler Lagrange equations of the complete energy functional. However, other techniques may be utilized to minimize the energy functional. For example, phase field methods may be employed for energy minimization to generate the desired contour.

As represented in equation 3, the internal energy is a function of the smoothness weight $\gamma(p)$. Furthermore, as can be seen from equation 4, the smoothness weight ($\gamma(p)$) is lower for contour segments having a higher weighted length ($\omega_i$). It should be noted that the smoothness weight is maximum at the center of a contour segment and decreases towards the segment end points. In certain example embodiments, a pre-determined value of the smoothness weight is assigned to intersection points of adjacent contour segments to prevent formation of kinks at the intersection points.

Figure 3:
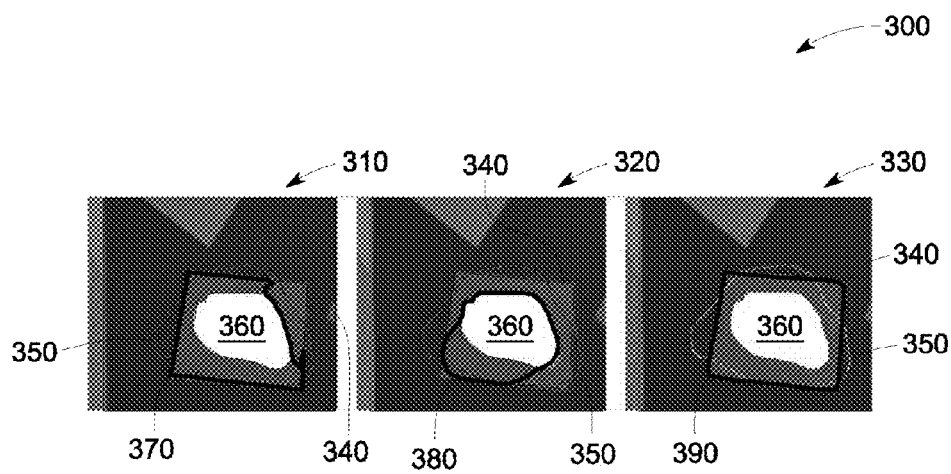
FIG. 3 illustrates example images generated by conventional image segmentation and tracking methods and by using the system of FIG. 2.

FIG. 3 illustrates example images 300 generated by conventional image object segmentation and tracking methods and by using the system 200 of FIG. 2. In this example embodiment, an output image using GVF segmentation on an input synthetic image is represented by reference numeral 310. Further, an output image using GVF segmentation with a uniform weight for smoothness term in the energy functional is represented by reference numeral 320. In addition, an output image using the system 200 of FIG. 2 is represented by reference numeral 330.

In this example embodiment, an image object 340 is tracked using an initial contour represented by reference numeral 350. In this exemplary embodiment, edges of an area 360 within the image object 340 are stronger than the edges of the image object 340. As a result, the resulting contour 370 using the standard GVF model is distracted towards a strong edge of the area 360. As can be seen, the initial contour 350, for some length, lies approximately midway between the boundary of the area 360 and the edge of the image object

340. However, the stronger edge formed by the area 360 drags the curve 350 to form the final contour 370.

The output image 320 using GVF segmentation with a uniform weight for smoothness term in the energy functional includes curvature based motion which is relatively stronger than the image based force near the boundaries of the image object 340. As can be seen, resulting contour 380 of the segmentation does not terminate at boundaries of the image object 340. Instead, the contour 380 is distracted towards a stronger edge of the area 360.

As illustrated in output image 330, a contour 390 using the technique described above results in substantially accurate segmentation of the image object 340. In this embodiment, the weighted curve length is higher for edges of the image object 340 as compared to the area 360. Therefore, the smoothness index is much higher near the boundaries of the area 360 as compared to near boundaries of the image object 340 resulting in substantially accurate segmentation of the image object 340.

The example methods and systems described above facilitate image segmentation and tracking of objects in images or videos using active contours. The technique utilizes a spatially adaptive internal energy term for contour evolution that improves robustness to clutter and reduces sensitivity to contour initialization.

The image segmentation technique described above may be utilized in a variety of applications such as for detection of tumors or injuries like ligament tears in medical images. The technique may be utilized for identification of objects/individuals in security and surveillance applications. Further, the technique may also be used for large scale image analysis for identifying objects in images obtained from satellites.

As will be appreciated by those of ordinary skill in the art, the foregoing example, demonstrations, and process steps may be implemented by suitable code on a processor-based system. It should also be noted that different implementations of the present technique may perform some or all of the steps described herein in different orders or substantially concurrently, that is, in parallel.

Furthermore, the functions may be implemented in a variety of programming languages, such as C++ or JAVA. Such code, as will be appreciated by those of ordinary skill in the art, may be stored or adapted for storage on one or more tangible, machine readable media, such as on memory chips, local or remote hard disks, optical disks (that is, CDs or DVDs), or other media, which may be accessed by a processor-based system to execute the stored code.

FIG. 4 is a block diagram illustrating an example computing device 400 that is arranged for image object tracking and segmentation in accordance with the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µc), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include an image processing algorithm 426 that is arranged to perform the functions as described herein including those described with respect to process 100 of FIG. 1. Program data 424 may include input images 428 with image objects for generating the desired contour for tracking the objects as is described herein.

In some embodiments, application 422 may be arranged to operate with program data 424 on operating system 420 such generation of the desired contour based upon the computed internal energy may be performed. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452.

Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 646 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal.

By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of image object tracking and segmentation, comprising:
   defining an initial contour for identifying an image object;
   partitioning the initial contour into a plurality of contour segments;

estimating a weighted length for a contour segment of the plurality of contour segments; and
generating a desired contour by converging the plurality of contour segments to a plurality of edges of the image object using the estimated weighted length,
wherein the converging the plurality of contour segments comprises:
estimating an external energy value for the contour segment,
estimating an internal energy value based upon the estimated weighted length and a smoothness index, the smoothness index associated with a gradient data of points along the contour segment,
combining the external and internal energy values to estimate an energy functional, and
minimizing the estimated energy functional to obtain the desired contour.

2. The method of claim 1, wherein the weighted length of the contour segment is estimated based upon length of the contour segment and a gradient magnitude of the image object.

3. The method of claim 1, wherein the partitioning of the initial contour comprises grouping points of the initial contour into the plurality of contour segments based upon a pre-determined threshold.

4. The method of claim 1, wherein the minimizing the estimated energy functional comprises:
determining a first contour segment comprising a weighted length above a threshold value;
determining a second contour segment comprising a weighted length below the threshold value; and
guiding the second contour segment toward the first contour segment to generate the desired contour.

5. The method of claim 1, further comprising assigning a pre-determined value of the smoothness index to intersection points of adjacent contour segments.

6. A method of image object tracking and segmentation, comprising:
initializing a contour for tracking an image object;
partitioning the contour into a plurality of contour segments;
estimating a weighted length of a contour segment of the plurality of contour segments based upon a length of the contour segment and a gradient of an underlying edge of the image object;
computing an internal energy value the contour segment based upon the estimated weighted length of the contour segment and a smoothness index, the smoothness index associated with a gradient data of points along the contour segment; and
generating a desired contour by guiding the plurality of contour segments towards edges of the image object using the computed internal energy value.

7. The method of claim 6, wherein the weighted length ($w_i$) for $i^{th}$ contour segment of a contour C having parameters $l(p_i)$ and $u(p_i)$ corresponding to beginning and end of the contour segment is estimated in accordance with relationship:

$$\omega_i = \frac{\int_{l(pi)}^{u(pi)} |\nabla I(C)||C_p| dp}{\int_0^1 |\nabla I(C)||C_p| dp}.$$

8. The method of claim 7, wherein the internal energy value for the contour segment with smoothness functional h(C) and a smoothness weight y(p) is estimated in accordance with relationship:

$$E_{int}(C) = \int_0^1 y(p)h(C) dp$$

wherein $$y(p) = (1 - \omega_i)\exp\left\{-\frac{L(p)}{\sigma_i^2}\right\},$$

L(p) distance of a point C(p) from midpoint of the $i^{th}$ contour segment and $\alpha_1$ is a parameter to control a gradient of the smoothness weight.

9. The method of claim 8, wherein the smoothness functional h(C) comprises a length minimizing function and a corresponding contour evolution for the contour C having curvature lc and an inward pointing normal N at the curve point C(p) is represented by the relationship:

$$C_t(P) = y(p)k(p)N(p).$$

10. The method of claim 8, wherein the distance L(p) is estimated in accordance with the relationship:

$$L(p) = \left| \frac{\int_{l(p)}^{u(p)} |c_P| dp}{2} - \int_{l(p)}^{p} |C_p| dp \right|.$$

11. The method of claim 8, wherein the smoothness weight y(p) is assigned a pre-determined value to intersection points of adjacent contour segments.

12. The method of claim 6, wherein the generating the desired contour comprises:
estimating an external energy value for the contour segment;
combining the external energy value with the computed internal energy value to estimate an energy functional; and
converging the plurality of contour segments to edges of the object by minimizing Euler-Lagrange equations of the energy functional.

13. A system for tracking an image object, comprising:
a memory circuit configured to store an input image with at least one image object;
an image processing circuit configured to initialize an initial contour for tracking the at least one image object and to obtain a desired contour by converging a plurality of contour segments to edges of the image object based upon an internal energy of the plurality of contour segments,
wherein the internal energy is estimated based upon a weighted length of a contour segment of the plurality of contour segments and a smoothness index, the smoothness index associated with a gradient data of points along the contour segment.

14. The system of claim 13, wherein the contour comprises a geometric contour, or a parametric representation.

15. The system of claim 14, wherein the contour comprises a cubic B-spline curve.

16. The system of claim 13, wherein the image processing circuit is further configured to estimate an energy functional by combining the internal energy value and an external energy value for the plurality of contour segments.

17. The system of claim 16, wherein the external energy value is estimated based upon at least one of a gradient of the image or a texture of the image.

18. The system of claim 16, wherein the image processing circuit is further configured to minimize the energy functional to converge the plurality of contour segments to edges of the image object.

19. The system of claim 13, wherein the image processing circuit is further configured to:
   determine a first contour segment comprising a weighted length above a threshold value;
   determine a second contour segment comprising a weighted length below the threshold value; and
   guide the second contour segment towards the first contour segment to generate the desired contour.

* * * * *

UNITED STATES PATENT AND TRADEMARK OFFICE
CERTIFICATE OF CORRECTION

PATENT NO. : 8,781,160 B2
APPLICATION NO. : 12/650894
DATED : July 15, 2014
INVENTOR(S) : Viswanathan et al.

Page 1 of 1

It is certified that error appears in the above-identified patent and that said Letters Patent is hereby corrected as shown below:

On the Title Page, in item (56), under "OTHER PUBLICATIONS", in Column 2, Line 6, delete "at: :" and insert -- at: --, therefor.

In the Drawings

In Fig. 4, Sheet 3 of 3, for Tag "438", in Line 1, delete "NON-Removable" and insert -- Non-Removable --, therefor.

In the Specification

In Column 3, Line 62, delete "Where:" and insert -- Where: L(p) --, therefor.

In Column 4, Line 58, in Equation (9), delete "$|\nabla f|^{2dxdy}$" and insert -- $|\nabla f|^{2dxdy}|$ --, therefor.

In Column 5, Line 24, delete "(RAID)," and insert -- (RAIDs), --, therefor.

In the Claims

In Column 11, Line 48, in Claim 6, delete "value the" and insert -- value of the --, therefor.

In Column 11, Line 56, in Claim 7, delete "length ($w_i$)" and insert -- length ($\omega_i$) --, therefor.

In Column 12, Line 3, in Claim 8, delete "y(p)" and insert -- $\gamma$(p) --, therefor.

In Column 12, Line 11, in Claim 8, delete "wherein" and insert -- wherein: --, therefor.

In Column 12, Line 38, in Claim 11, delete "y(p)" and insert -- $\gamma$(p) --, therefor.

Signed and Sealed this
Second Day of December, 2014

Michelle K. Lee
*Deputy Director of the United States Patent and Trademark Office*